June 5, 1951 J. S. SHUTER 2,555,378
SPEED HOSE CLAMP WITH PARALLEL SCREW
Filed Jan. 24, 1947 2 Sheets-Sheet 1
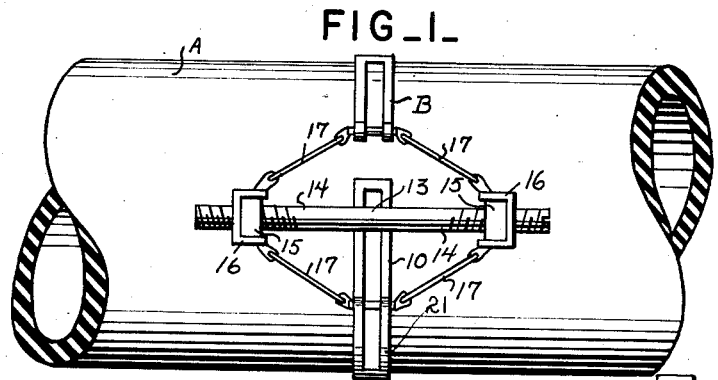
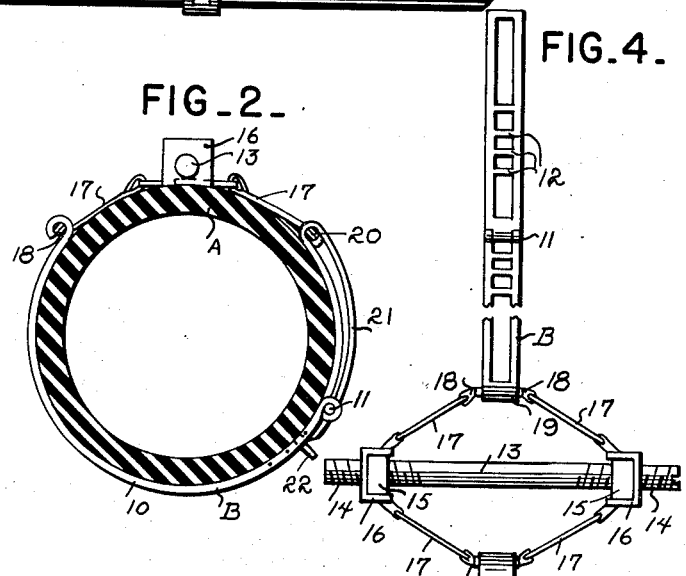
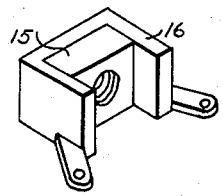
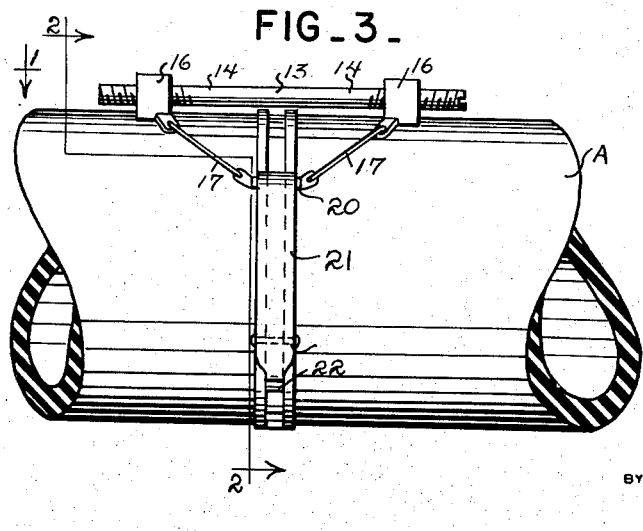
INVENTOR.
James S. Shuter
BY Victor J. Evans &Co.
ATTORNEYS June 5, 1951 J. S. SHUTER 2,555,378
SPEED HOSE CLAMP WITH PARALLEL SCREW
Filed Jan. 24, 1947 2 Sheets-Sheet 2
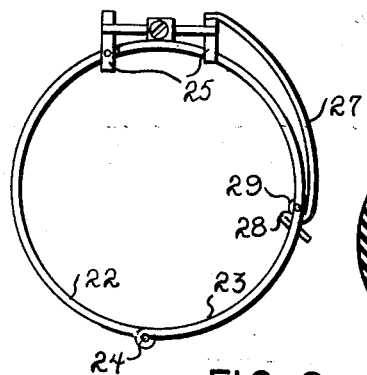
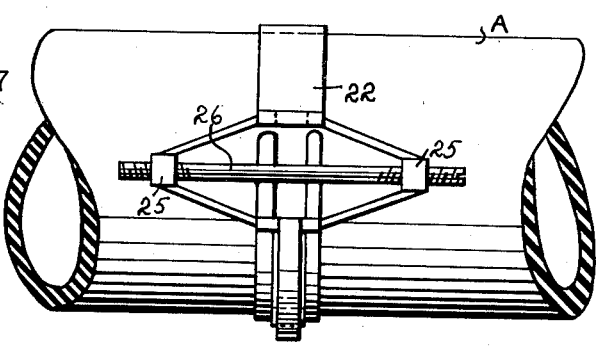
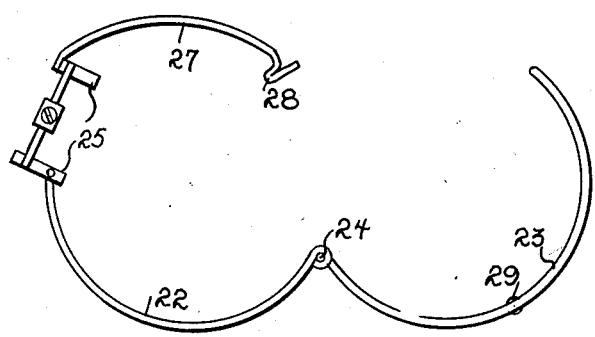
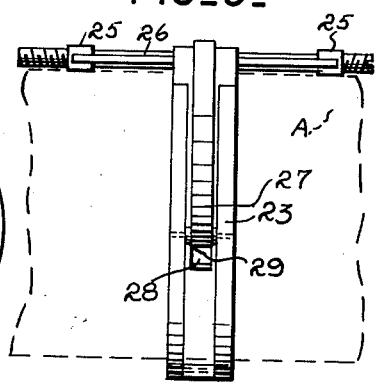
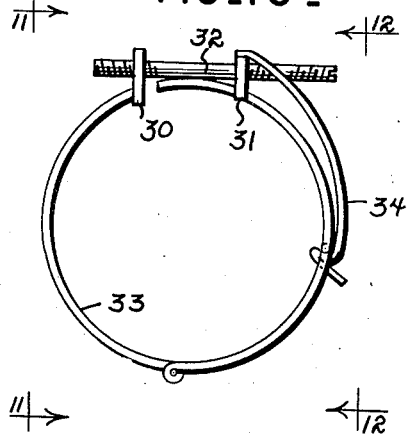
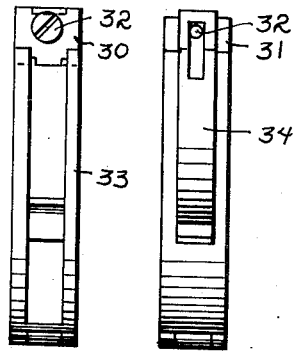
INVENTOR.
James S. Shuter
BY Victor J. Evans & Co.
ATTORNEYS Patented June 5, 1951

2,555,378

UNITED STATES PATENT OFFICE 2,555,378

SPEED HOSE CLAMP WITH PARALLEL SCREW

James S. Shuter, Jacksonville, Fla.

Application January 24, 1947, Serial No. 723,992

1 Claim. (Cl. 24—19)

The invention relates to a ring-like clamp, and more especially to a snap spring latching clamp for watering hose or the like.

The primary object of the invention is the provision of a clamp of this character, wherein there is employed a speed screw for engaging the clamp to the work or disengaging the same therefrom, with ease and dispatch, the clamp being of novel construction and is unique in the assembly of its parts.

Another object of the invention is the provision of a clamp of this character, wherein it can be snap latched in position on the work and can be tightened for the firm holding of the work in place, the clamp being readily and easily adjusted, and is susceptible of quick application and removal.

A further object of the invention is the provission of a clamp of this character, wherein it can be readily opened for removal from the work and closed about the same for firm and secure clamping thereof, the clamp being screw adjusted.

A still further object of the invention is the provision of a clamp of this character, which is simple in construction, thoroughly reliable and efficient in operation, strong, durable, possessed of few parts, compact, and inexpensive to manufacture and install.

With these and other objects in view, the invention consists in the features of construction, combination and arrangement of parts as will be hereinafter more fully described, illustrated in the accompanying drawings, which disclose the preferred and modified forms of construction thereof, and pointed out in the claim hereunto appended.

In the accompanying drawings:

Figure 1 is a fragmentary plan view of a watering hose, having the clamp constructed in accordance with the invention applied thereto;

Figure 2 is a sectional view taken on the line 2—2 of Figure 3 looking in the direction of the arrows;

Figure 3 is a view similar to Figure 1, looking in the direction of the arrows from the line 1—1 of Figure 3;

Figure 4 is a plan view of the clamp removed;

Figure 5 is a perspective view of one of the screw followers of the clamp;

Figure 6 is an elevation of a slight modification of clamp;

Figure 7 is a plan view showing the application of the clamp in Figure 6;

Figure 8 is an elevation showing the clamp disclosed in Figures 6 and 7 in open position;

Figure 9 is a side view of the clamp in applied position;

Figure 10 is an elevation of a further modified form of clamp;

Figure 11 is a side view thereof;

Figure 12 is a side view looking from the reverse side from that shown in Figure 11.

Similar reference characters indicate corresponding parts throughout the several views in the drawings.

Referring to drawings in detail, particularly Figures 1 to 3, and 5, inclusive, A designates generally a portion of a piece of watering hose, which is of the usual well known construction, and B denotes generally the clamp therefor constituting the present invention. This clamp B comprises one or several outwardly bowed or curved band-like sections 10, which are coupled at their meeting ends by a hinge 11, and each section has cut therein cross keeper webs 12, which are spaced apart from each other for a determined distance of the length thereof.

In association with the sections 10 is a speed feed screw 13, having reverse threaded portions 14 for follower nuts 15 tapped thereon, and both wearing saddling members 16, to which are connected pivotally links 17, these being also pivotally connected couplings 18, one having hinge 19 engagement with a section 10, and the other a hinge 20 engagement with a snap spring latch 21, which is outwardly bowed or curved and is adapted at its hook-end 22 to selectively engage with any one of the cross webs 12 when the clamp is placed in embracing position about the hose A, as best seen in Figures 1, 2 and 3 of the drawings. In these figures of the drawings, the clamp therein is shown with a single section 10, while in Figure 4 there is shown several sections 10.

On adjustment of the screw 13 when the clamp is closed about the hose A, and after the latch 21 has engaged with a selected web 12, the said clamp B can be firmly and securely tightened onto the said hose for clamping activity thereto.

In Figures 6 to 9 inclusive, of the drawings, there is shown a modification of the invention, wherein the clamp involves a pair of outwardly bowed or curved band-like sections 22 and 23 respectively, these being connected by a hinge 24, while fixed to one of the nuts 25, on the feed screw 26, is a spring snap latch 27, which has its hook bill 28 adapted for selected engagement with a keeper 29 formed in the section 22, so that the clamp can be fastened tight about a hose, as should be obvious.

In Figures 10, 11 and 12, inclusive, of the drawings, there is shown a further modification of the invention, wherein the follower nuts 30 and 31 respectively are on a feed screw 32, and one of these nuts is fixed to the section 33, while the other nut is free of both sections and carries the snap spring latch 34, which is engageable with one of the sections next thereto, as is the case in Figures 6 to 9 of the drawings.

The clamps shown in the drawings have a wide range adjustment, and can be readily and easily opened for release from the work or closed about the same, with ease and dispatch.

What is claimed is:

A clamp of the kind described comprising a hinged sectional bandlike opening and closing element having free ends that are adapted to removably embrace a piece of circular work, a hinge ear on said element adjacent one of the free ends thereof, a coupling pin loosely mounted in said ear and said pin having apertured ends, a snap spring latch having a hooked end and a hinge ear on the opposite end, a coupling pin having apertured ears on the outer ends loosely mounted in said last ear, a feed screw adapted to extend in a plane parallel to the axis of the element and having the opposite ends thereof threaded, feed nuts engaging the threads and disposed at opposite ends of the screw, and the movement of the feed nuts on the feed screw being at right angles to the circular plane of the element, apertured ears on said feed nuts, links loosely connected at their opposite ends to the apertured ears on the pins on the element and latch and the apertured ears on the feed nuts, keeper webs formed in said element and the hooked end of said spring latch engageable with selected keeper webs and said element adjustably acted upon by said screws.

JAMES S. SHUTER.

REFERENCES CITED

The following references are of record in the file of this patent:

UNITED STATES PATENTS

| Number | Name | Date |
|---|---|---|
| 407,559 | Wells | July 23, 1889 |
| 442,135 | Peterson | Dec. 9, 1890 |
| 1,442,909 | Ryan | Jan. 23, 1923 |
| 1,730,511 | Johnson | Oct. 8, 1929 |
| 2,324,538 | Robinson | July 20, 1943 |